US008332216B2

(12) United States Patent
Kurniawati et al.

(10) Patent No.: US 8,332,216 B2
(45) Date of Patent: Dec. 11, 2012

(54) SYSTEM AND METHOD FOR LOW POWER STEREO PERCEPTUAL AUDIO CODING USING ADAPTIVE MASKING THRESHOLD

(75) Inventors: Evelyn Kurniawati, Singapore (SG); Sapna George, Singapore (SG)

(73) Assignee: STMicroelectronics Asia Pacific PTE., Ltd., Singapore (SG)

( * ) Notice: Subject to any disclaimer, the term of this patent is extended or adjusted under 35 U.S.C. 154(b) by 1264 days.

(21) Appl. No.: 11/507,678

(22) Filed: Aug. 22, 2006

(65) Prior Publication Data

US 2007/0162277 A1 Jul. 12, 2007

Related U.S. Application Data

(60) Provisional application No. 60/758,369, filed on Jan. 12, 2006.

(51) Int. Cl.

| | |
|---|---|
| ***G10L 19/02*** | (2006.01) |
| ***G10L 11/06*** | (2006.01) |
| ***G10L 19/14*** | (2006.01) |
| *G06F 15/00* | (2006.01) |
| *G10L 19/00* | (2006.01) |

(52) U.S. Cl. ......... 704/229; 704/200; 704/230; 704/500

(58) Field of Classification Search .......... 704/200–201, 704/205–211, 226–230, 500–504, E19.001–E21.02
See application file for complete search history.

(56) References Cited

U.S. PATENT DOCUMENTS 4,815,134 A 3/1989 Picone et al.
5,651,090 A * 7/1997 Moriya et al. ............. 704/200.1
5,682,461 A * 10/1997 Silzle et al. .................. 704/205
5,682,463 A * 10/1997 Allen et al. .................. 704/230
5,752,223 A * 5/1998 Aoyagi et al. ................ 704/219
5,956,674 A * 9/1999 Smyth et al. ............... 704/200.1
6,226,608 B1 * 5/2001 Fielder et al. ................ 704/229
6,356,870 B1 * 3/2002 Hui et al. ...................... 704/500
6,526,385 B1 * 2/2003 Kobayashi et al. ........... 704/504
6,810,377 B1 * 10/2004 Ho et al. ....................... 704/208
6,952,677 B1 * 10/2005 Absar et al. .................. 704/500
7,003,449 B1 * 2/2006 Absar et al. ................ 704/200.1
7,395,211 B2 * 7/2008 Watson et al. ................ 704/500

(Continued)

FOREIGN PATENT DOCUMENTS

EP 1 117 089 7/2001

(Continued)

OTHER PUBLICATIONS

Lindblom, Jonas. "A Sinusoidal Voice Over Packet Coder Tailored for the Frame-Erasure Channel." IEEE Transactions on Speech and Audio Processing. vol. 13, No. 5. Sep. 2005. pp. 787-798.*

*Primary Examiner* — Paras D Shah
*Assistant Examiner* — David Kovacek
(74) *Attorney, Agent, or Firm* — Munck Wilson Mandala, LLP

(57) ABSTRACT

A method for stereo audio perceptual encoding of an input signal includes masking threshold estimation and bit allocation. The masking threshold estimation and bit allocation are performed once every two encoding processes. Another method for stereo audio perceptual encoding of an input signal includes performing a time-to-frequency transformation, performing a quantization, performing a bitstream formatting to produce an output stream, and performing a psychoacoustics analysis. The psychoacoustics analysis includes masking threshold estimation on a first of every two successive frames of the input signal.

19 Claims, 5 Drawing Sheets

U.S. PATENT DOCUMENTS

| | | | | |
|---|---|---|---|---|
| 7,630,902 | B2 * | 12/2009 | You | 704/500 |
| 2003/0091194 | A1 * | 5/2003 | Teichmann et al. | 381/2 |
| 2003/0115042 | A1 * | 6/2003 | Chen et al. | 704/200.1 |
| 2003/0115051 | A1 * | 6/2003 | Chen et al. | 704/230 |
| 2004/0002856 | A1 * | 1/2004 | Bhaskar et al. | 704/219 |
| 2004/0196913 | A1 * | 10/2004 | Chakravarthy et al. | 375/254 |
| 2005/0144017 | A1 * | 6/2005 | Kabi et al. | 704/500 |
| 2006/0074693 | A1 * | 4/2006 | Yamashita | 704/500 |
| 2007/0016414 | A1 * | 1/2007 | Mehrotra et al. | 704/230 |
| 2007/0124141 | A1 * | 5/2007 | You | 704/230 |
| 2007/0162277 | A1 * | 7/2007 | Kurniawati et al. | 704/200.1 |
| 2008/0002842 | A1 * | 1/2008 | Neusinger et al. | 381/119 |

FOREIGN PATENT DOCUMENTS

| | | |
|---|---|---|
| EP | 1 160 769 | 12/2001 |
| GB | 2 322 776 | 9/1998 |
| GB | 2 390 788 | 1/2004 |

* cited by examiner

SYSTEM AND METHOD FOR LOW POWER STEREO PERCEPTUAL AUDIO CODING USING ADAPTIVE MASKING THRESHOLD

CROSS-REFERENCE TO RELATED APPLICATIONS

This disclosure claims priority under 35 U.S.C. §119(e) to U.S. Provisional Patent Application No. 60/758,369 filed on Jan. 12, 2006, which is hereby incorporated by reference.

TECHNICAL FIELD

This disclosure is generally directed to audio compression and more specifically to a system and method for low power stereo perceptual audio coding using adaptive masking threshold.

BACKGROUND

Digital audio transmission typically requires a considerable amount of memory and bandwidth. To achieve an efficient transmission, signal compression is generally employed. Efficient coding systems are those that could optimally eliminate irrelevant and redundant parts of an audio stream. The first is achieved by reducing psycho acoustical irrelevancy through psychoacoustics analysis. The phrase "perceptual audio coder" refers to those compression schemes that exploit the properties of human auditory perception.

FIG. 1 illustrates the basic structure of a perceptual encoder 100. Typically, a perceptual encoder 100 includes a filter bank 110, a quantization unit 120, and a psychoacoustics module 130. The psychoacoustics module 130 can include spectral analysis 132 and masking threshold calculation 134. In a more advanced encoder, extra spectral processing is performed before the quantization unit 120. This spectral processing block is used to reduce redundant components and includes mostly prediction tools. These basic building blocks make up the differences between various perceptual audio encoders. The quantization unit 120 can feed an entropy coding unit 140.

The filter bank 110 is responsible for time-to-frequency transformation. The move to the frequency domain is used since the encoding utilizes the masking property of the human ear, which is calculated in the frequency domain. The window size and transform size determines the time and frequency resolution, respectively. Most encoders are equipped with the ability to adapt to fast changing signals by switching to more refined time resolutions. This block switching strategy may be crucial to avoid pre-echo artifacts, which refer to the spreading of quantization noise throughout the window size.

Earlier encoders, such as MPEG layer 1 and layer 2 encoders, use a subband filter as their transform engine. MPEG layer 3 uses a hybrid filter, which is an enhancement of the subband filter with Modified Discrete Cosine Transform (MDCT). The Advanced Audio Coder (AAC) dropped the backward compatibility with previous encoders and uses only MDCT. A similar transform was also used in Dolby AC3. The advantage of using MDCT is in its Time Domain Aliasing Cancellation (TDAC) concept, which removes the blocking artifacts.

The psychoacoustics module 130 determines the masking threshold, which is needed to judge which part of a signal is important to perception and which part is irrelevant. The resulting masking threshold is also used to shape the quantization noise so that no degradation is perceived due to this quantization process. The details of psychoacoustics modeling are known to those of skill in the art and are unnecessary for understanding the embodiments disclosed below.

Bit allocation and quantization is the last crucial module in a typical perceptual audio encoder. A non-uniform quantizer is used to reduce the dynamic range of the data, and two quantization parameters for step size determination are adjusted such that the quantization noise falls below the masking threshold and the number of bits used is below the available bit rate. These two conditions are commonly referred to as distortion control loop and rate control loop. Within the quantization, more advanced encoders, such as MPEG layer 3 and AAC, incorporate noiseless coding for redundancy reduction to enhance the compression ratio.

The presence of the psychoacoustics module and the bit allocation-quantization are two reasons why an encoder has a much higher complexity compared to a decoder. While audio encoding standards are definite enough to ensure that a valid stream is correctly decodable by the decoders, they are flexible enough to accommodate variations in implementations, suited to different resource availability and application areas.

SUMMARY

According to various disclosed embodiments, there is provided a method for stereo audio perceptual encoding of an input signal. The method includes masking threshold estimation and bit allocation, where the masking threshold estimation and bit allocation are performed once every two encoding processes.

According to other disclosed embodiments, there is provided a method for stereo audio perceptual encoding of an input signal. The method includes performing a time-to-frequency transformation, performing a quantization, performing a bitstream formatting to produce an output stream, and performing a psychoacoustics analysis. The psychoacoustics analysis includes masking threshold estimation on a first of every two successive frames of the input signal.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8 and the various embodiments described in this disclosure are by way of illustration only and should not be construed in any way to limit the scope of the invention. Those skilled in the art will recognize that the various embodiments described in this disclosure may easily be modified and that such modifications fall within the scope of this disclosure.

The phrase "perceptual audio coder" as used herein refers to audio compression schemes that exploit the properties of human auditory perception. Various embodiments include techniques for allocating quantization noise elegantly below the masking threshold to make it imperceptible to the human ear. Such processes may require considerable computational effort, especially due to the psychoacoustics analysis and bit allocation-quantization process. Techniques disclosed herein include methods to simplify the psychoacoustics modeling process by adaptively reusing the computed masking threshold depending on the signal characteristics. Also disclosed is a method to patch potential spectral hole problems that might occur when the quantization parameters are reused. Various embodiments can be applied to generic stereo perceptual audio encoders, where low computational complexity is required. Various embodiments provide alternative low power implementations of a stereo perceptual audio encoder by exploiting stationary signal characteristics such that the resulting masking threshold can be reused either across frame or across channel.

Figure 1:
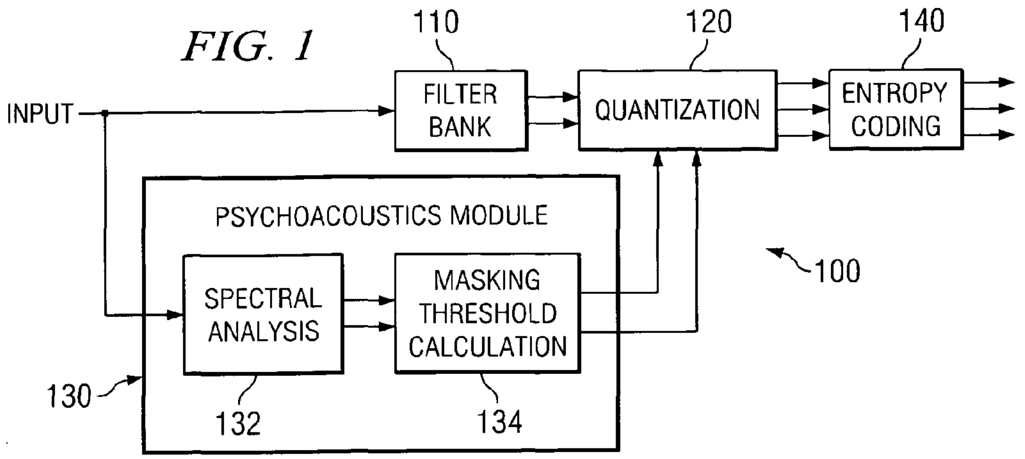
FIG. 1 illustrates a basic structure of a perceptual encoder.
Figure 2:
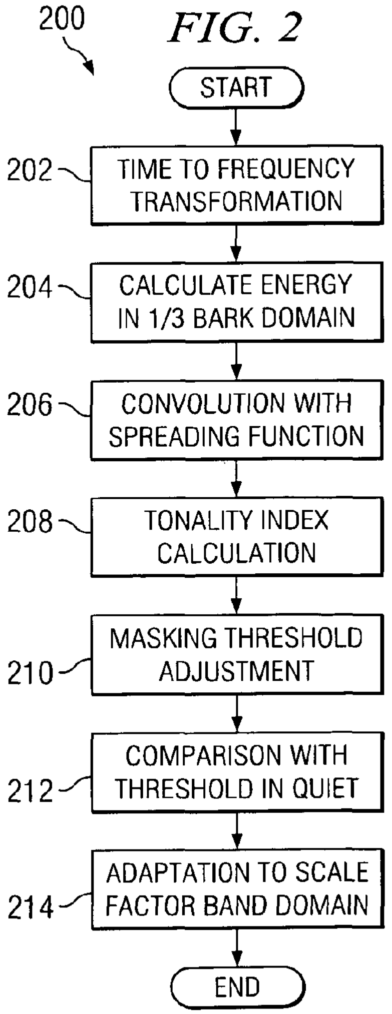
FIG. 2 illustrates a process for calculating a masking threshold.

A high quality perceptual coder has an exhaustive psychoacoustics model (PAM) to calculate the masking threshold, which is an indication of the allowed distortion. FIG. 2 illustrates a process for calculating a masking threshold, as would be performed by a suitable processing system known to those of skill in the art. At step 202, the system performs a time-to-frequency transformation. At step 204, the system calculates energy in the ⅓ bark domain. At step 206, the system performs a convolution with spreading function. At step 208, the system performs a tonality index calculation. At step 210, the system performs a masking threshold adjustment. At step 212, the system performs a comparison with the threshold in a quiet state. At step 214, the system performs an adaptation to scale factor band domain.

Two of the most computationally intensive processes are the time-to-frequency transformation 202 and the convolution with spreading function 206. It has been suggested to use the result from the encoder transform engine for the analysis and to use a simple triangle spreading function instead to reduce the complexity. However, this analysis is still being performed every frame for each channel.

In a typical process, the bit allocation-quantization is the second computationally tasking module, as the encoder has to perform the nested iteration to arrive at a set of parameters that satisfies both distortion and bit rate criteria. Even after significant effort to reduce the complexity of the rate control loop, this process is still performed per channel per frame.

Music, for example, is a quasi-stationary signal. During the stationary stage, the signal characteristics do not change much through time. This implies that their psychoacoustical properties do not vary much either. In a stationary stage, the masking threshold, which represents the amount of tolerable quantization noise, is relatively similar within a period of time. Accordingly, the scale factor value, which is the distortion controlling variable, also remains relatively stationary.

The slow and gradual change of the signal across frames enables further compression by performing a prediction technique on these values. During the transient portion of the signal, however, these assumptions are no longer valid. A fast varying signal has a more dynamic spectral characteristic. During this time, the encoder switches to short block, having three times the number of short block scale factor set (3×12 for 44.1 kHz sampling rate).

Various embodiments of this disclosure include reusing the masking threshold for adjacent frames when the signal is relatively stationary. With this method, the expensive effort to estimate the masking threshold is only done once (for both channels) every two frames. However, as mentioned above, this scheme may not be ideal when used with a transient type of signal. In this case, the encoder will switch to reusing the masking threshold across channel, providing the same amount of computational saving since the masking threshold is computed only for one channel per frame.

Various factors can be optimized in accordance with various embodiments. One factor is the way the encoder distinguishes transient from stationary signals. Another factor is the potential spectral hole that appears when the masking threshold is reused.

Figure 3:
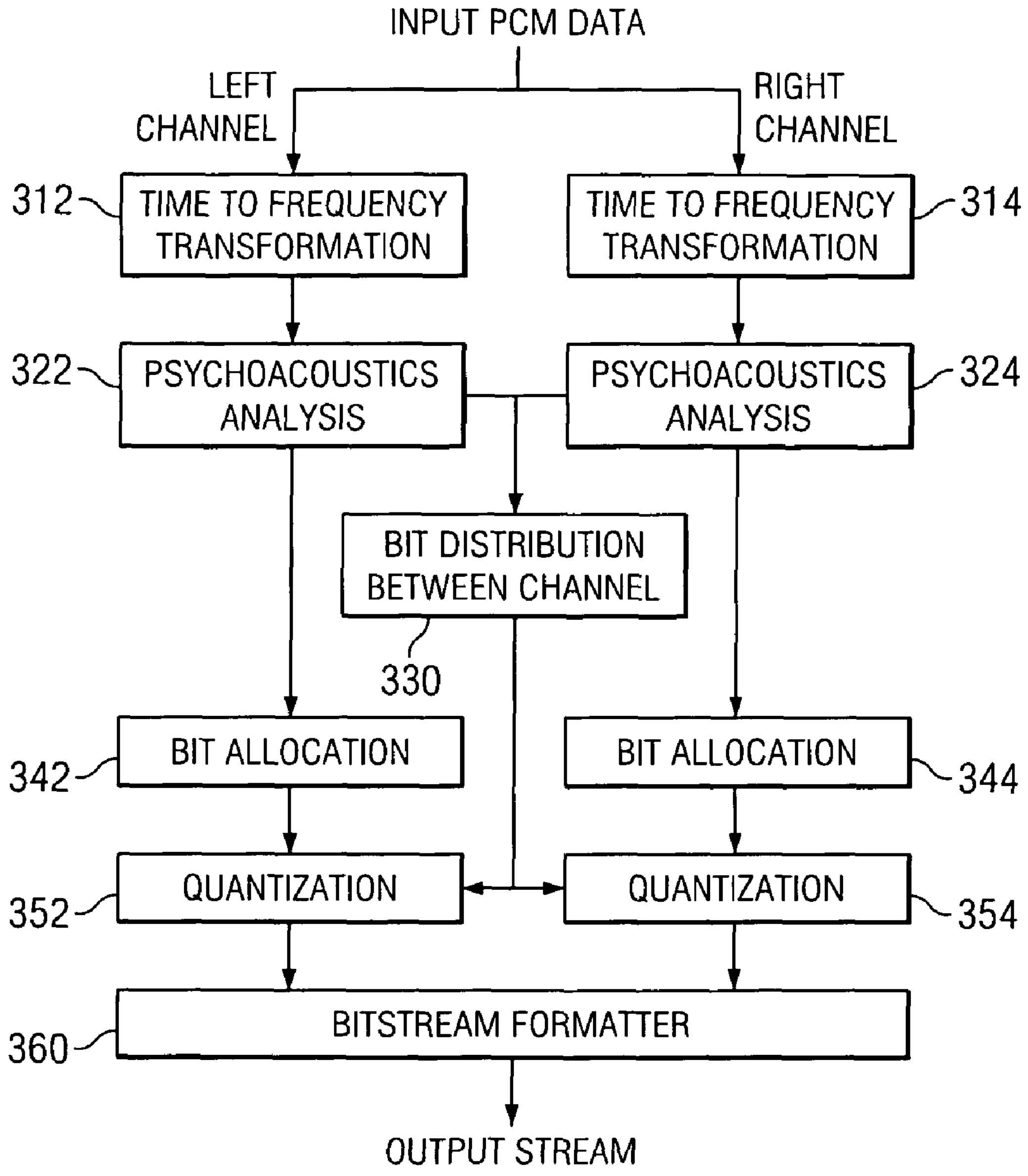
FIG. 3 illustrates a process for stereo perceptual encoding.

FIG. 3 illustrates a process for stereo perceptual encoding. For simplicity, assume here that the psychoacoustics analysis uses the same filter bank as the time-to-frequency transformation. In this structure, the analysis is done for every frame for each channel. Likewise, the bit allocation is done in the same manner. The next frame processing will repeat the same process as depicted in FIG. 3.

In FIG. 3, the input pulse code modulated (PCM) audio data is received in stereo on a left channel and a right channel. The system processes each channel using a time-to-frequency transformation 312/314. The system then performs a psychoacoustics analysis 322/324 on each channel, which produces a bit distribution between channel 330.

The system then performs a bit allocation 342/344 on each channel. The system performs a quantization 352/354 on each channel using the bit distribution across channel generated at 330. The quantized channels are fed to a bitstream formatter 360, which produces the output stream.

Figure 4:
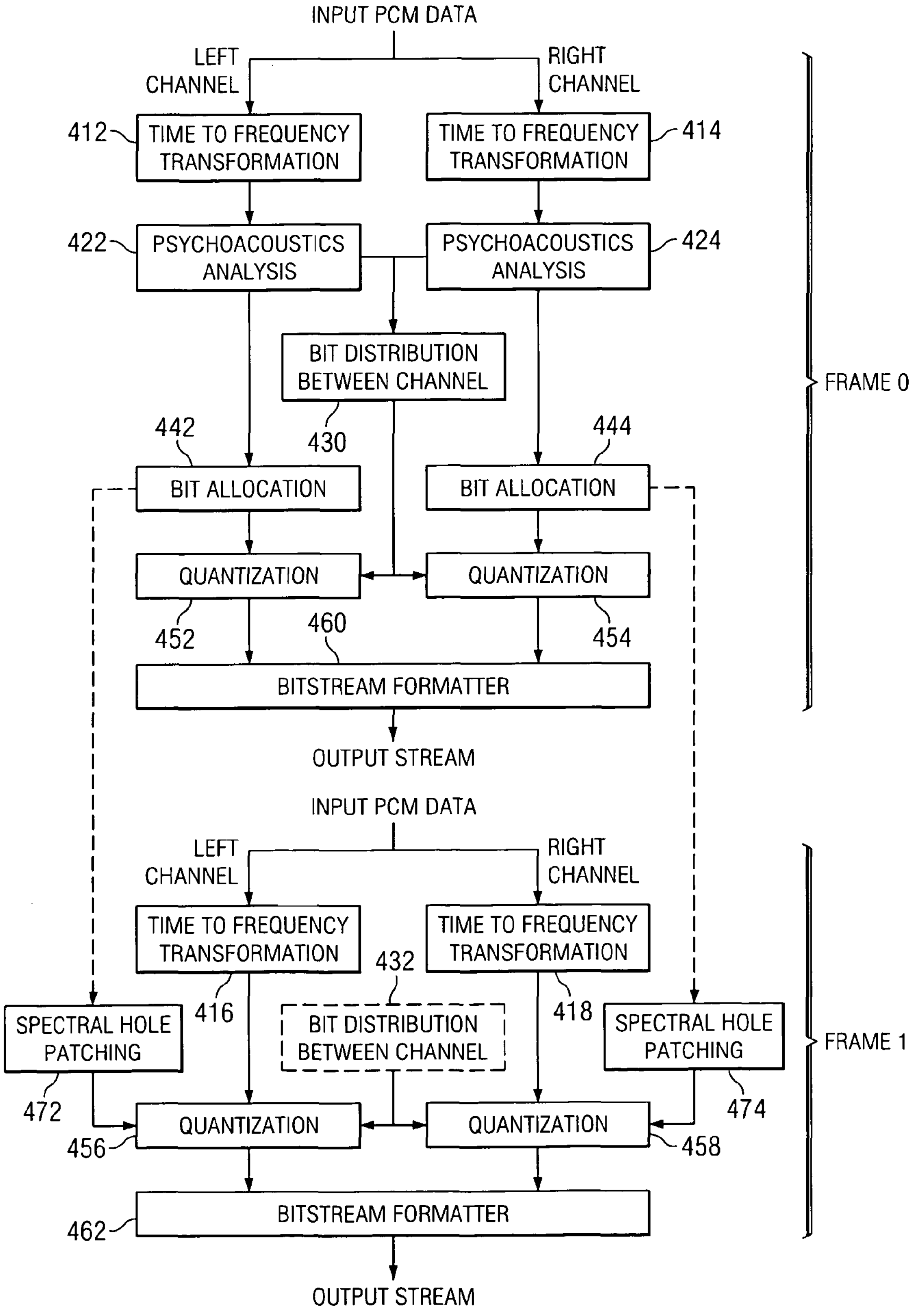
FIG. 4 illustrates an encoder process in accordance with this disclosure.

FIG. 4 illustrates an encoder process in accordance with this disclosure that can be used, for example, when the same masking threshold is used for the next frame. FIG. 4 depicts the processing of two consecutive frames (shown as Frame 0 and Frame 1), although this process can apply to any two consecutive frames as described herein.

For Frame 0, the input PCM audio data is received in stereo on a left channel and a right channel. The system processes each channel using a time-to-frequency transformation 412/414. The system then performs a psychoacoustics analysis 422/424 on each channel (including masking threshold estimation) and calculates bit distribution between channel information 430. The bit distribution between channels module assesses how many bits should be given to each channel, taking into consideration the signal characteristics derived from the psychoacoustics analysis.

The system then performs a bit allocation 442/444 on each channel. The system performs a quantization 452/454 on each channel using the bit distribution across channel generated at 430. The quantized channels are fed to a bitstream formatter 460, which produces the output stream.

For Frame 1 (the subsequent frame), the input PCM audio data is received in stereo on a left channel and a right channel. The system processes each channel using a time-to-frequency transformation 416/418 similar to 412/414. There is no psychoacoustics analysis being performed on the second frame because the masking threshold is assumed to be the same. The bit allocation process need not be repeated in frame 1 as the distortion controlling parameter (the scale factors) are replicated in Frame 1, with the addition of "spectral hole patching" module 472/474.

Since the bit distribution between channels is not performed in the next frame and since it is assumed that the signal characteristic is stationary, the bit distribution across channel information is also reused, and the reused bit distribution across channel 430 is shown as dotted-line element 432. This information can be used during the quantization process to find the rate controlling variable (the global scale factor). This method is referred to herein as a "cross-frame" strategy. Therefore, in this process, the masking threshold estimation and bit allocation are performed once every two encoding processes. The system performs a quantization 456/458 on each channel using the bit distribution across channel generated at 430 (shown as replicated at 432). The quantized channels are fed to a bitstream formatter 462, which produces the output stream.

In various embodiments, general purpose controllers and processors can be programmed to perform the processes described herein, or specialized hardware modules can be used for some or all of the individual processes. Where similar steps are performed in Frame 0 and Frame 1, the same physical module can perform the like processes for subsequent frames. For example, quantization 452 and quantization 456 can be performed by a single quantization module as the two frames are processed in succession.

Figure 5:
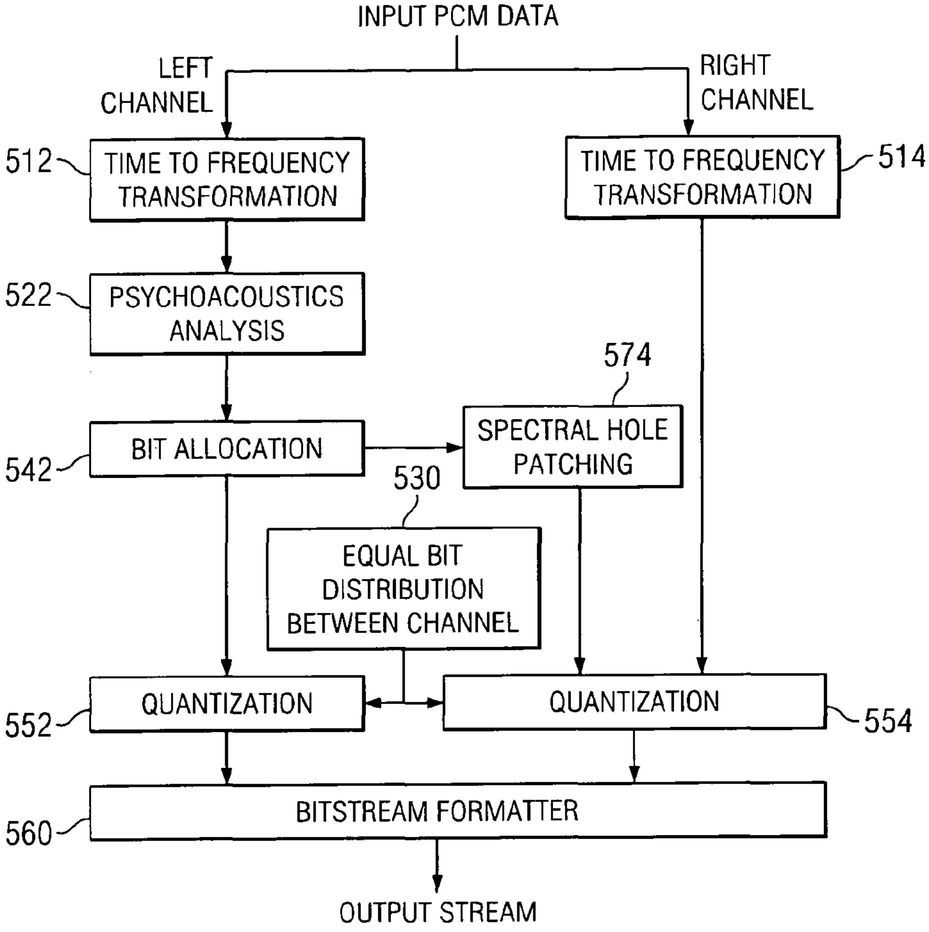
FIG. 5 illustrates another encoder process in accordance with this disclosure.

FIG. 5 illustrates another encoder process in accordance with this disclosure. When the signal characteristics change to transient, an encoder in accordance with various disclosed embodiments can switch to reusing the masking threshold across channel as illustrated in FIG. 5. Similar to the process described above, no psychoacoustics analysis and bit allocation are performed. "Spectral hole patching" is also implemented prior to the replication of quantization parameters. One difference in the processes is in the bit distribution across channel. Since this case only has the psychoacoustics information of one channel, it is assumed that both channels would demand an equal number of bits. Thus, the bit budget of this frame is split equally per channel. This method is referred to herein as a "cross-channel" strategy.

In FIG. 5, the input PCM audio data is received in stereo on a left channel and a right channel. The system processes each channel using a time-to-frequency transformation 512/514. The system then performs a psychoacoustics analysis 522 on one channel (including masking threshold estimation). While shown here as occurring using the left channel, it could be performed on the right channel instead. The system calculates bit distribution between channel information 530. The bit distribution between channel module assesses how many bits should be given to each channel, taking into consideration the signal characteristics derived from the psychoacoustics analysis.

The system then performs a bit allocation 542 on one channel. While shown here as involving the left channel, it could be performed on the right channel instead. Using the results of the bit allocation, spectral hole patching 574 is performed. The system performs a quantization 552/554 on each channel. The quantized channels are fed to a bitstream formatter 560, which produces the output stream.

One challenge of various disclosed processes is to determine the transient portion of the signal so that the corresponding strategy can be applied accordingly. Fortunately, most if not all existing encoders are equipped with transient detect modules for block switching determinations to avoid pre-echo artifacts as discussed above. Various disclosed embodiments make use of this result to choose between the cross-frame and cross-channel strategies.

When a transient is detected, the encoder may attempt to switch to a shorter window length. However, prior to using the short window, a start window can be applied. Upon going back to a longer window, a stop window can be used. In some encoders, one major difference of these window types is in the number of consecutive short windows used during transient events within one frame. For example, MP3 uses three consecutive short windows, AAC uses eight short windows, and Dolby AC3 uses two short windows.

Figure 6:
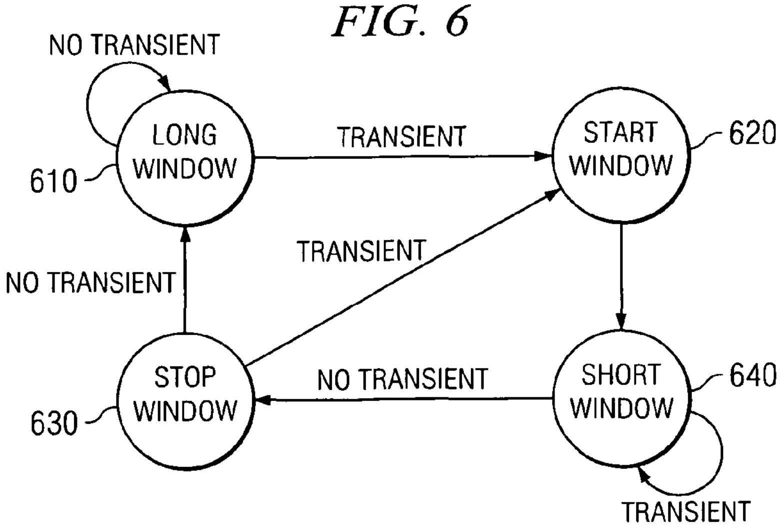
FIG. 6 illustrates a window switching state diagram in accordance with this disclosure.

FIG. 6 illustrates a window switching state diagram in accordance with this disclosure. The number of arrows shows the number of possible pairs of consecutive window types used. Each of these possibilities can be mapped with the most suitable scheme. In various embodiments, there are seven possibilities of window types used in consecutive frames as illustrated in FIG. 7 and described below.

In FIG. 6, a start window 620 always transitions to a short window 640. The short window 640, on a transient, remains on the short window 640. The short window 640, on no transient, transitions to a stop window 630. The stop window 630, on a transient, transitions to the start window 620. The stop window 630, on no transient, transitions to a long window 610. The long window 610, on a transient, transitions to the start window 620. The long window 610, on no transient, remains on the long window 630.

A stationary signal is generally processed using long window. Any other window type generally signifies the presence of a transient signal. Therefore, only a long-long window combination should be processed using the cross-frame strategy. However, the strategy is determined during the processing of the first frame. Unless one frame buffering is performed, the transient in the second frame would not be detected. For this reason, inevitably the cross-frame strategy is also used for the long-start window combination.

Figure 7:
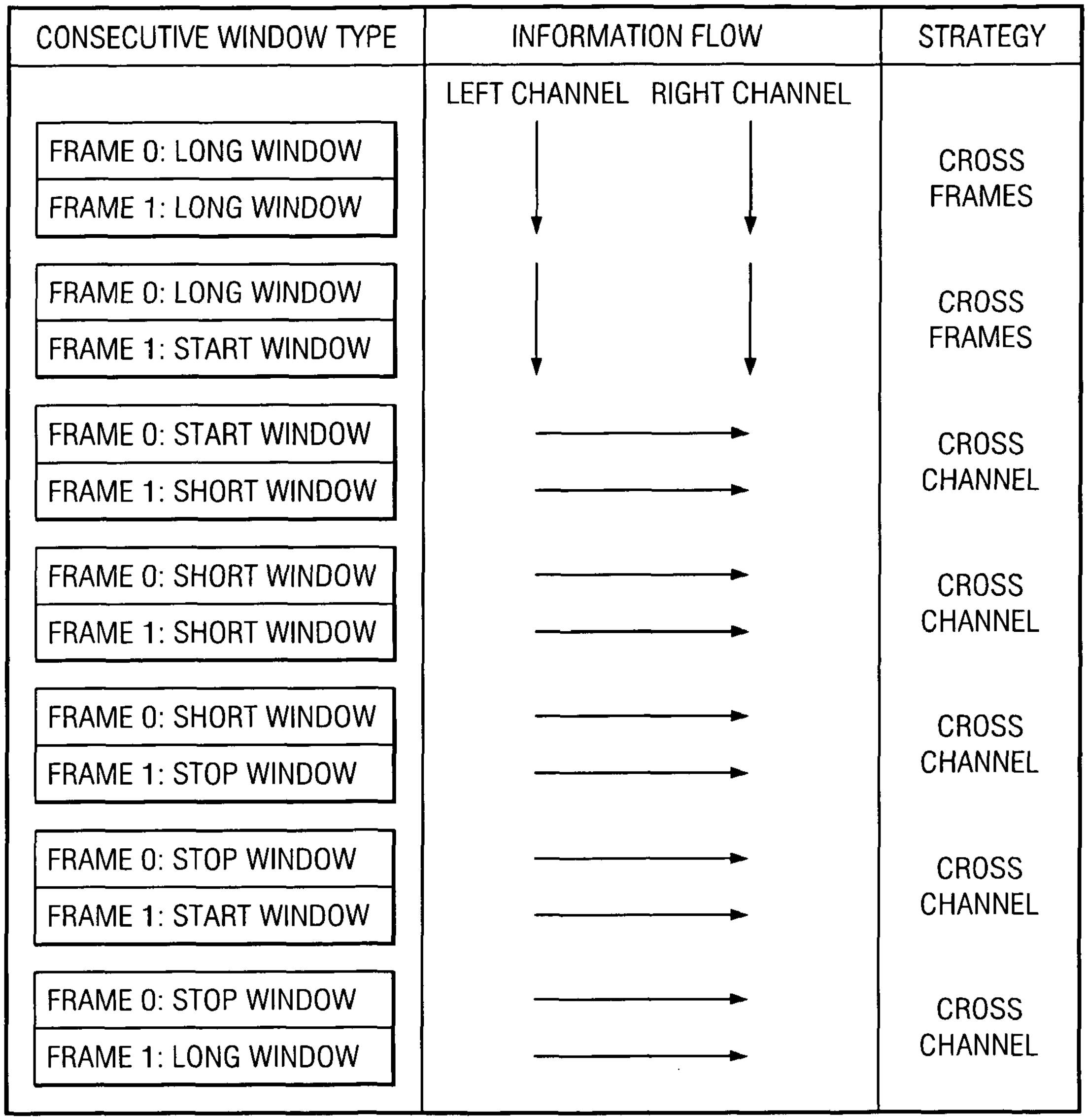
FIG. 7 illustrates a table that summarizes a strategy for all seven combinations of block types in accordance with this disclosure.

FIG. 7 illustrates a table that summarizes a strategy for all seven combinations of block types in accordance with this disclosure. For each window combination for Frames 0 and 1, the appropriate cross-frame or cross-channel strategy is indicated.

As discussed above, another factor to be considered is the potential spectral hole problem, including a sudden disappearance of spectral lines causing an annoying artifact commonly referred to as birdies. In various embodiments, when the energy of a band is below the masking threshold, the scale factor for that band may be set to zero to signify that the spectral lines of this band need not be coded. This value could pose a potential hole when being reused, specifically when the target band has energy higher than the masking threshold. To rectify this problem, an extra checking is performed during the copying process. The "spectral hole patching" module performs a check on the copied scale factors. If zero is detected, an energy calculation is carried out on that particular band to make sure that it is indeed below the masking threshold. If the calculated energy ends up higher, the scale factor value may be patched by linearly interpolating its adjacent values.

The disclosed embodiments can be applied to any perceptual encoder that uses the concept of achieving compression by hiding the quantization noise under the estimated masking threshold. In an example filter bank module, for example, MP3 uses a hybrid subband and MDCT filter bank. The analysis subband filter bank is used to split the broadband signal into 32 equally spaced subbands.

Figure 8:
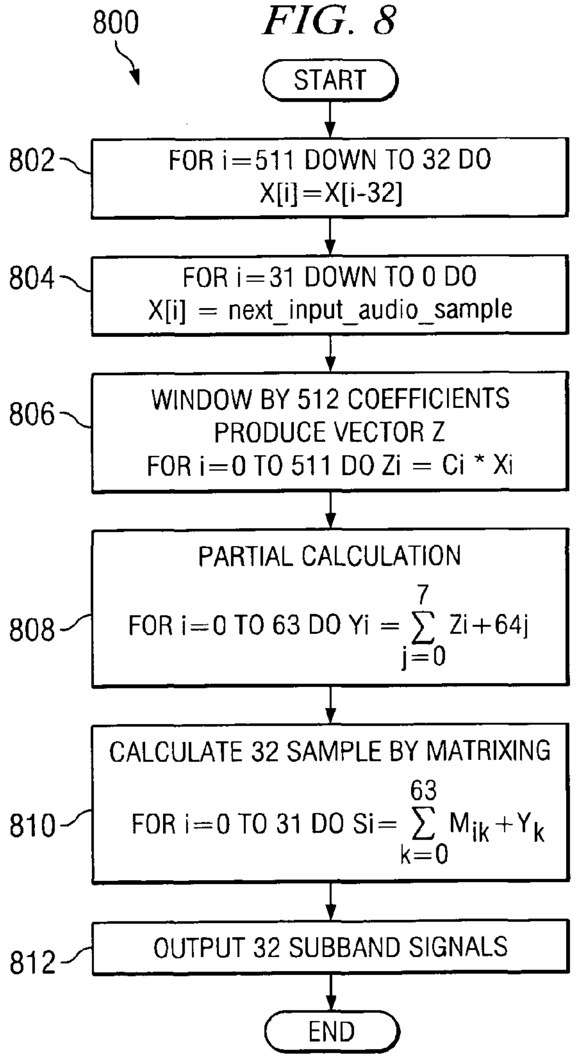
FIG. 8 illustrates an encoding process that can be performed by a suitable processing system in accordance with this disclosure.

FIG. 8 illustrates an encoding process that can be performed by a suitable processing system in accordance with this disclosure. The MDCT used is formulated as follows:

$$X_i = \sum_{k=0}^{n-1} z_k \cos\left(\frac{\pi}{2n}\left(2k+1+\frac{n}{2}\right)(2i+1)\right), \quad i = 0 \text{ to } n-1$$

where z is the windowed input sequence, k is the sample index, i is the spectral coefficient index, and n is the window length (12 for short block and 36 for long block). The size is determined by the transient detect module.

As shown in FIG. 8, at step 802, for i=511 down to 32, the system calculates X[i]=X[i−32]. At step 804, for i=31 down to 0, the system calculates X[i]=next_input_audio_sample.

At step 806, the system windows by 512 coefficients to produce Vector Z, where for i=0 to 511 do Zi=Ci*Xi. At step 808, a partial calculation is performed for i=0 to 63, where $$Yi = \sum_{j=0}^{7} Zi + 64j.$$

At step 808, the system calculates 32 samples by matrixing, for i=0 to 31, where $$Si = \sum_{k=0}^{63} M_{ik} + Y_k.$$

Finally, at step 812, the system outputs 32 subband signals.

An example embodiment includes a transient detect module and scheme determination. Transient detection determines the appropriate window size of the encoder, failing which pre-echo artifacts will appear. In some embodiments, an energy comparison of consecutive short windows occurs. If a sudden increase in energy is detected, the frame can be marked as transient frame.

The smallest encoding block of MP3 is called a granule of 576 samples length. Two granules make up one MP3 frame. Various disclosed embodiments can be applied either across these granules or across the two stereo channels. Only the very first result of the transient detect is used for the scheme determination. If the first granule is detected as stationary (using a long window), this granule and the next one would use a cross-granule strategy. As discussed above, even when the second granule ends up detecting a transient (a long-start block combination), the cross-granule strategy may still be used. The rest of the combination may use the cross-channel strategy as summarized above.

Various embodiments of this disclosure include a psychoacoustics model (PAM). The calculation of the masking threshold may follow the process as illustrated in FIG. 3, with various embodiments including one or more of the following changes:

- for efficiency reasons, the MDCT spectrum can be used for the analysis;
- the calculation can be performed directly in the scale factor band domain instead of in the partition domain (⅓rd bark);
- a simple triangle spreading function is used with +25 dB per bark and −10 dB per bark slope;
- the tonality index is computed using Spectral Flatness Measure instead of unpredictability; and
- the masking threshold adjustment can take the number of available bits as input and adjust the masking threshold globally based on it.

In an example embodiment, bit allocation-quantization MP3 uses a non-uniform quantizer:

$$\text{x\_quantized}(i) = int\left[\frac{x^{\frac{3}{4}}}{2^{\frac{3}{16}(gl-scf(i))}} + 0.0946\right]$$

where i is the scale factor band index, x is the spectral values within that band to be quantized, gl is the global scale factor (the rate controlling parameter), and scf(i) is the scale factor value (the distortion controlling parameter).

In various embodiments, for the cross-granule strategy, the quantization parameters are only calculated for both channels in the first granule. After the spectral hole patching, these values are reused in the second granule. For the cross-channel strategy, the parameters are calculated for both granules but only on the left channel. After the spectral hole patching, they are reused for the right channel quantization.

Various embodiments disclosed herein provide a new method of low power stereo encoding of music and other auditory signals by reusing the masking threshold across frames or across channels depending on the signal characteristics. With this method, the intensive calculation of the masking threshold estimation and the bit allocation can be avoided once every two processes, which results in a lower processing power being needed for the encoding task.

In various embodiments, the decision of reusing the masking threshold is based on the signal characteristics. When the signal is stationary, the masking threshold is reused across frames. When the signal is of a transient characteristic, the masking threshold is reused across channels. In some embodiments, the bit distribution across channels is also reused when the masking threshold is reused across frames and is set to equal distribution when the masking threshold is reused across channels.

In some embodiments, the strategy to use either the cross-channel or the cross-frame scheme is mapped to the seven possible pairs of window types used in a perceptual audio encoder. Also, in some embodiments, the masking threshold is reused by means of copying the distortion controlling quantization parameters. Further, in some embodiments, spectral hole patching is applied prior to the reusing of the distortion controlling quantization parameters by linearly interpolating the adjacent parameter values when the actual energy of that band is found to be above the masking threshold.

In some embodiments, various functions described above may be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. However, the various coding functions described above could be implemented using any other suitable logic (hardware, software, firmware, or a combination thereof).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term “or” is inclusive, meaning and/or. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term “controller” means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for stereo audio perceptual encoding of an input signal, comprising:

performing a time-to-frequency transformation;
performing a quantization;
performing a bitstream formatting to produce an output stream;
performing a psychoacoustics analysis including masking threshold estimation for a first channel on a first of every two successive frames of the input signal; and
reusing the estimated masking threshold on each first frame for a second channel and, unless the input signal is a transient signal, for the first and second channels of the second of the respective two successive frames, wherein when the input signal is of a transient characteristics, the masking threshold is reused only across channels within each individual frame.

2. The method of claim 1, further comprising:

performing a bit allocation on the first of every two successive frames of the input signal; and
reusing the bit allocation either across channels or across frames.

3. The method of claim 2, wherein reusing the bit allocation either across channels or across frames is at least partially carried out with spectral hole patching.

4. The method of claim 1, further comprising:

performing a bit distribution between channels on the first of every two successive frames of the input signal; and
reusing the bit distribution across frames.

5. The method of claim 1, wherein, when the input signal is stationary, the masking threshold is reused both across channels within each frame and across frames within each two successive frames.

6. The method of claim 5, wherein a bit distribution across channels is reused when the masking threshold is reused across frames.

7. The method of claim 1, wherein a bit distribution across channels is set to an equal distribution when the masking threshold is reused across channels.

8. The method of claim 1, wherein the masking threshold is reused across channels or across frames according to one of seven possible pairs of window types used in a perceptual audio encoder, the seven possible pairs being:

long window:long window,
long window:start window,
start window:short window,
short window:short window,
short window:stop window,
stop window:start window, and
stop window:long window.

9. The method of claim 1, wherein the estimated masking threshold is reused by copying distortion controlling quantization parameters.

10. The method of claim 1, further comprising spectral hole patching applied prior to copying the distortion controlling quantization parameters, the spectral hole, patching comprising linearly interpolating adjacent parameter values when an actual energy of a band is above the masking threshold.

11. The method of claim 1, wherein, when the input signal is stationary, the masking threshold is reused across both channels and frames of each two successive frames, and when the input signal is of a transient characteristic, the masking threshold is reused only across channels of each individual frame.

12. A method for stereo audio perceptual encoding of an input signal, comprising:

performing a time-to-frequency transformation;
performing a quantization;
performing a bitstream formatting to produce an output stream;
performing a psychoacoustics analysis including masking threshold estimation for a first channel on a first frame of the input signal;
when the input signal is stationary across the first frame and a second, next successive frame of the input signal, reusing the estimated masking threshold for a second channel of the first frame and for both first and second channels of the second frame; and
when the input signal is transient across the first and second frames,
reusing the estimated masking threshold for the second channel of the first frame, and
performing a psychoacoustics analysis including masking threshold estimation for the first channel on the second frame.

13. The method of claim 12, further comprising:

performing a bit allocation on the first frame of the input signal; and
when the input signal is stationary across the first and second frames, reusing the bit allocation across the first and second channels for both the first and second frames.

14. The method of claim 12, further comprising:

performing a bit distribution between channels on the first frame of the input signal; and
when the input signal is stationary across the first and second frames, reusing the bit distribution across the first and second frames.

15. The method of claim 14, wherein reusing the bit allocation is at least partially carried out with spectral hole patching.

16. The method of claim 12, wherein a bit distribution across the first and second channels is reused when the masking threshold is reused across the first and second frames.

17. The method of claim 12, wherein, when the input signal is transient across the first and second frames, the bit distribution across channels is set to an equal distribution.

18. The method of claim 12, wherein the masking threshold is reused according to one of seven possible pairs of window types used in a perceptual audio encoder, the seven possible pairs being:

long window:long window,
long window:start window, start window:short window,
short window:short window,
short window:stop window,
stop window: start window, and
stop window:long window.

19. The method of claim 12, wherein the estimated masking threshold is reused by copying distortion controlling quantization parameters.

* * * * *